US011828676B2

United States Patent
Nakamura et al.

(10) Patent No.: US 11,828,676 B2
(45) Date of Patent: Nov. 28, 2023

(54) OPTICAL PULSE REFLECTOMETRY AND OPTICAL PULSE REFLECTOMETER

(71) Applicant: NIPPON TELEGRAPH AND TELEPHONE CORPORATION, Tokyo (JP)

(72) Inventors: Atsushi Nakamura, Musashino (JP); Keiji Okamoto, Musashino (JP); Hiroyuki Oshida, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 101 days.

(21) Appl. No.: 17/596,368

(22) PCT Filed: Jun. 11, 2019

(86) PCT No.: PCT/JP2019/023148
§ 371 (c)(1),
(2) Date: Dec. 8, 2021

(87) PCT Pub. No.: WO2020/250310
PCT Pub. Date: Dec. 17, 2020

(65) Prior Publication Data
US 2022/0244137 A1 Aug. 4, 2022

(51) Int. Cl.
*G01M 11/00* (2006.01)
(52) U.S. Cl.
CPC .... *G01M 11/3145* (2013.01); *G01M 11/3154* (2013.01)

(58) Field of Classification Search
CPC .. G01M 11/30; G01M 11/31; G01M 11/3109; G01M 11/3118; G01M 11/3127;
(Continued)

(56) References Cited

U.S. PATENT DOCUMENTS 10,345,192 B2 * 7/2019 Chen .................. H04J 14/04
11,391,644 B2 * 7/2022 Nakamura ......... G01M 11/3109
(Continued)

FOREIGN PATENT DOCUMENTS

JP 2017003338 A * 1/2017

OTHER PUBLICATIONS

A. Nakamura et al., "High-sensitivity detection of fiber bends: 1-μm-band mode-detection OTDR", Journal of Lightwave Technology, vol. 33, No. 23, pp. 4862-4869, 2015.
(Continued)

*Primary Examiner* — Gordon J Stock, Jr.
(74) *Attorney, Agent, or Firm* — Harness, Dickey & Pierce, P.L.C.

(57) ABSTRACT

The purpose of this invention is to provide an optical pulse testing method and optical pulse testing device capable of measuring the loss at an end farther than an axially misaligned connection point at which inter-mode crosstalk occurs independently from the crosstalk value at the point. In this optical pulse testing method, a matrix (loss and crosstalk) representing the mode coupling at a near-end connection point is calculated, and an OTDR waveform having the effects of crosstalk eliminated therefrom is obtained by numerical processing using the calculated matrix representing the mode coupling.

4 Claims, 11 Drawing Sheets

(58) Field of Classification Search
CPC ......... G01M 11/3136; G01M 11/3145; G01M 11/3154; G01M 11/3163; G01M 11/3172; G01M 11/3181; G01M 11/319
See application file for complete search history.

(56) References Cited

U.S. PATENT DOCUMENTS

| | | | |
|---|---|---|---|
| 11,598,692 B2* | 3/2023 | Nakamura | G01M 11/3136 |
| 2017/0264367 A1* | 9/2017 | Awwad | H04J 14/04 |
| 2022/0065741 A1* | 3/2022 | Endo | G02B 6/4292 |
| 2022/0381645 A1* | 12/2022 | Nakamura | G01M 11/39 |

OTHER PUBLICATIONS

A. Nakamura et al., "Effective mode field diameter for LP11 mode and its measurement technique", IEEE Photon. Technol. Lett., vol. 28, No. 22, pp. 2553-2556, 2016.
M. Yoshida et al., "Mode coupling measurement at a splice point between few-mode fibers using a synchronous multi-channel OTDR", OFC 2016, Th1J. 4, 2016.
A. Nakamura et al., "A method for estimating loss and crosstalk at a splice point in two-mode fibers from OTDR waveforms", EXAT2019, P-01, 2019.

* cited by examiner

OPTICAL PULSE REFLECTOMETRY AND OPTICAL PULSE REFLECTOMETER

CROSS-REFERENCE TO RELATED APPLICATIONS

This application is a 371 U.S. National Phase of International Application No. PCT/JP2019/023148, filed on Jun. 11, 2019.

TECHNICAL FIELD

The present disclosure relates to a testing method for a few-mode optical fiber and a testing device thereof.

BACKGROUND ART

With the increase in large-capacity content represented by videos and games and the spread of smartphones, the amount of traffic in optical fiber networks is increasing year by year. On the other hand, the limit of transmission capacity is approaching for single-mode fibers currently used as a transmission medium. Mode multiplex transmission using few-mode fibers is attracting attention as one technique for coping with future traffic increase.

As a testing method for optical fibers, an optical time domain reflectometry (hereinafter referred to as OTDR) is well known. The OTDR is a method and device for causing pulsed test light to be incident to an optical fiber under test (hereinafter referred to as FUT) and obtaining distribution data (OTDR waveform) on the basis of the intensity of the backward scattered light of Rayleigh scattered light or Fresnel reflection light and the round trip time originating from the test light pulse propagating in the optical fiber. This technique can be used to test the optical properties of optical fibers. NPL 1 and NPL 2 disclose methods for testing the properties of a few-mode fiber using OTDR using a mode multiplexer/demultiplexer.

CITATION LIST

Patent Literature

[NPL 1] A. Nakamura et al., "High-sensitivity detection of fiber bends: 1-μm-band mode-detection OTDR", J. Lightw. Technol., vol. 33, no. 23, pp. 4862-4869, 2015.
[NPL 2] A. Nakamura et al., "Effective mode field diameter for LP11 mode and its measurement technique", IEEE Photon. Technol. Lett., vol. 28, no. 22, pp. 2553-2556, 2016.
[NPL 3] M. Yoshida et al., "Mode coupling measurement at a splice point between few-mode fibers using a synchronous multi-channel OTDR", OFC 2016, Th1J. 4, 2016.
[NPL 4] A. Nakamura et al., "A method for estimating loss and crosstalk at a splice point in two-mode fibers from OTDR waveforms", EXAT2019, P-01, 2019.

SUMMARY OF THE INVENTION

Technical Problem

However, the testing methods described in NPL 1 and NPL 2 has a problem that, when the FUT has an axially misaligned connection point at which inter-mode crosstalk occurs, the crosstalk value affects the loss measurement result at an end farther than the connection point (on the side opposite to the incident end of the test light pulse) and deteriorates the loss measurement accuracy at the far end.

The present invention has been made in view of the above circumstances, and an object thereof is to provide an optical pulse testing method and optical pulse testing device capable of measuring the loss at an end farther than an axially misaligned connection point at which inter-mode crosstalk occurs independently from the crosstalk value at the point.

Means for Solving the Problem

In order to achieve the above object, in the optical pulse testing method and the optical pulse testing device according to the present invention, a matrix (loss and crosstalk) representing the mode coupling at a near-end connection point is calculated, and an OTDR waveform having the effects of crosstalk eliminated therefrom is obtained by numerical processing using the calculated matrix representing the mode coupling.

Specifically, an optical pulse testing method according to the present invention includes: inputting a test light pulse in the fundamental mode to one end of an optical fiber under test having a connection point, the test light pulse having a wavelength that can propagate in a fundamental mode and a first higher-order mode; measuring one intensity distribution of each of a fundamental mode component and a first higher-order mode component of a return light of the test light pulse with respect to a distance from the one end; inputting another test light pulse in the first higher-order mode to one end of the optical fiber under test, the another test light pulse having a wavelength that can propagate in the fundamental mode and the first higher-order mode; measuring other intensity distribution of each of a fundamental mode component and a first higher-order mode component of a return light of the test light pulse with respect to the distance from the one end; calculating a coupling efficiency between fundamental mode groups, a coupling efficiency between the fundamental mode and the first higher-order mode group, and a coupling efficiency between the first higher-order mode groups at the connection point of the optical fiber under test, which are calculated from one or both of one backscattered light intensity of the one intensity distribution and another backscattered light intensity of the other intensity distribution; obtaining a mode coupling matrix at the connection point of the optical fiber under test, which has the coupling efficiencies as elements; correcting the one backscattered light intensity and the another backscattered light intensity using the mode coupling matrix; and calculating loss on the other end side from the connection point of the optical fiber under test, the loss is calculated from the corrected backscattered light intensities.

An optical pulse testing device according to the present invention includes: a measurement circuit that inputs a test light pulse in the fundamental mode to one end of an optical fiber under test having a connection point, the test light pulse having a wavelength that can propagate in a fundamental mode and a first higher-order mode and measures one intensity distribution of each of a fundamental mode component and a first higher-order mode component of a return light of the test light pulse with respect to the distance from the one end; another measurement circuit that inputs another test light pulse in the first higher-order mode to one end of the optical fiber under test, the another test light pulse having a wavelength that can propagate in the fundamental mode and the first higher-order mode and measures other intensity distribution of each of a fundamental mode component and a first higher-order mode component of a return light of the test light pulse with respect to the distance from the one end; a matrix calculation circuit that calculates a coupling efficiency between fundamental mode groups, a coupling efficiency between the fundamental mode and the first higher-order mode group, and a coupling efficiency between the first higher-order mode groups at the connection point of the optical fiber under test, which are calculated from one or both of one backscattered light intensity of the one intensity distribution and another backscattered light intensity of the other intensity distribution and obtains a mode coupling matrix at the connection point of the optical fiber under test, which has the coupling efficiencies as elements; a backscattered light intensity correction circuit that corrects the one backscattered light intensity and the another backscattered light intensity using the mode coupling matrix; and a loss calculation circuit that calculates loss on the other end side from the connection point of the optical fiber under test, the loss is calculated from the corrected backscattered light intensities.

In the optical pulse testing method and the optical pulse testing device according to the present invention, a mode coupling matrix at a connection point is acquired in advance, a matrix operation is performed on the backscattered light intensity at a measurement target point, and the effects of a connection point on an incident side of a test light pulse at the measurement target point are eliminated from the backscattered light intensity. Therefore, the present invention can provide an optical pulse testing method and optical pulse testing device capable of measuring the loss at an end farther than an axially misaligned connection point at which inter-mode crosstalk occurs independently from the crosstalk value at the point.

In the optical pulse testing method and the optical pulse testing device according to the present invention, the backscattered light intensity correction circuit corrects the backscattered light intensity using Formula (C1).

[Formula C1]
$$P_{corrected}(z) = \begin{cases} P_{bs}(z) \times P_{in}^{-1} & (0 \leq z < z_1) \\ T_1^{-1} \times P_{bs}(z) \times P_{in}^{-1} \times T_1^{-1} & (z_1 \leq z < z_2) \\ T_I^{-1} \times P_{bs}(z) \times P_{in}^{-1} \times T_1^{-1} & (z_2 \leq z) \end{cases} \quad (C1)$$

where z is the distance from the one end of the optical fiber under test, $z_1$ is the distance from the one end to the first connection point present in the optical fiber under test, $z_2$ is the distance ($z_1 < z_2$) from the one end to the second connection point present in the optical fiber under test, $P_{corrected}(z)$ is a matrix of the corrected backscattered light intensities, $P_{bs}(z)$ is a matrix whose elements are the one back scattered light intensity and the another back scattered light intensity, $P_{in}$ is a matrix of the test light pulse, and $T_1$ is the mode coupling matrix at the first connection point.

Effects of the Invention

The present invention can provide a testing method and a testing device capable of accurately measuring the loss at an end farther than an axially misaligned connection point at which inter-mode crosstalk occurs in a FUT having the connection point.

DESCRIPTION OF EMBODIMENTS

Figure 1:
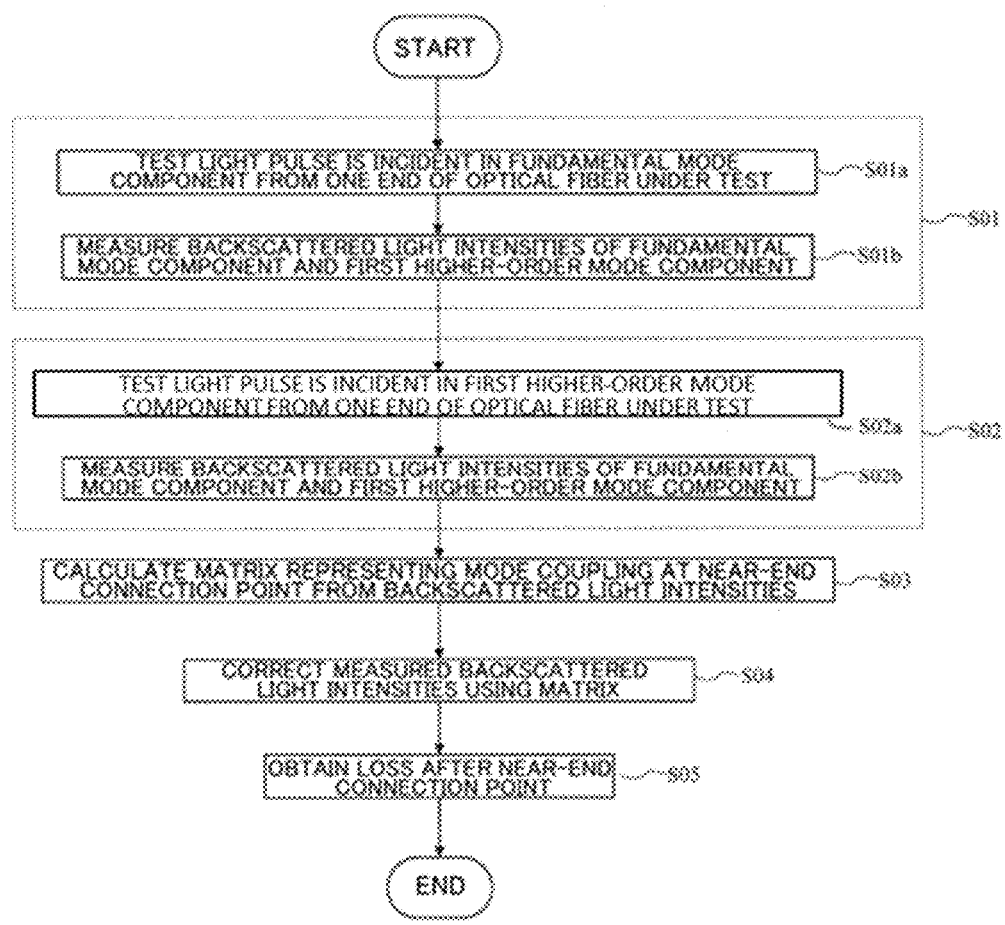
FIG. 1 is a diagram illustrating an optical pulse testing method according to the present invention.

Embodiments of the present invention will be described with reference to the accompanying drawings. The embodiments described below are examples of the present invention, and the present invention is not limited to the following embodiments. In the present specification and drawings, the same components are denoted by the same reference numerals.

Embodiment 1

FIG. 1 is a process diagram illustrating an optical pulse testing method of the present embodiment. In this optical pulse testing method, a first measurement procedure S01, a second measurement procedure S02, a matrix calculation procedure S03, a backscattered light intensity correction procedure S04, and a loss calculation procedure S05, which are described below, are performed. In the first measurement procedure S01, a test light pulse having a wavelength that can propagate in a fundamental mode and a first higher-order mode is incident in the fundamental mode from one end of an optical fiber under test having a connection point (step S01a), and an intensity distribution of each of a fundamental mode component and a first higher-order mode component of a return light of the test light pulse with respect to the distance from the one end is measured (step S01b). In the second measurement procedure S02, a test light pulse having a wavelength that can propagate in the fundamental mode and the first higher-order mode is incident in the first higher-order mode from one end of the optical fiber under test (step S02a), and an intensity distribution of each of a fundamental mode component and a first higher-order mode component of a return light of the test light pulse with respect to the distance from the one end is measured (step S02b). In the matrix calculation procedure S03, the coupling efficiency between fundamental mode groups, the coupling efficiency between the fundamental mode and the first higher-order mode group, and the coupling efficiency between the first higher-order mode groups are calculated at the connection point of the optical fiber under test from one or both of the backscattered light intensity measured in the first measurement procedure S01 and the backscattered light intensity measured in the second measurement procedure S02. Then, a mode coupling matrix at the connection point of the optical fiber under test, which has the coupling efficiencies as elements, is obtained. In the backscattered light intensity correction procedure S04, the backscattered light intensities measured in the first measurement procedure S01 and the second measurement procedure S02 are corrected using the mode coupling matrix obtained in the matrix calculation procedure S03. In the loss calculation procedure S05, the loss on the other end side from the connection point of the optical fiber under test is calculated from the corrected backscattered light intensities obtained in the backscattered light intensity correction procedure S04.

In the first measurement procedure S01, a generation step, an incident step, a mode demultiplexing step, and a light intensity acquisition step are performed. In the generation step, a test light pulse having a wavelength that can propagate through the optical fiber under test in the fundamental mode and the first higher-order mode is generated. In the incident step, the test light pulse generated in the generation step is incident to one end of the optical fiber under test in the fundamental mode. In the mode demultiplexing step, the return light of the test light pulse incident to one end of the optical fiber under test in the incident step is separated into a fundamental mode component and a first higher-order mode component. In the light intensity acquisition step, the mode components of the return light separated in the mode demultiplexing step are photoelectrically converted, and the intensity distribution of each of the mode components of the return light with respect to the distance from one end of the optical fiber under test is obtained. That is, in the first measurement procedure S01, backscattered light intensity distributions of the fundamental mode and the first higher-order mode from one end of the optical fiber under test are measured by the test light pulse in the fundamental mode using such a backscattered light measurement technique as illustrated in NPL 1 and NPL 2.

In the second measurement procedure S02, a generation step, an incident step, a mode demultiplexing step, and a light intensity acquisition step are performed. In the generation step, a test light pulse having a wavelength that can propagate through the optical fiber under test in the fundamental mode and the first higher-order mode. In the incident step, the test light pulse generated in the generation step is incident to one end of the optical fiber under test in the first higher-order mode. In the mode demultiplexing step, the return light of the test light pulse incident to one end of the optical fiber under test in the incident step is separated into a fundamental mode component and a first higher-order mode component. In the light intensity acquisition step, the mode components of the return light separated in the mode demultiplexing step are photoelectrically converted, and the intensity distribution of each of the mode components of the return light with respect to the distance from one end of the optical fiber under test is obtained. That is, in the second measurement procedure S02, backscattered light intensity distributions of the fundamental mode and the first higher-order mode from one end of the optical fiber under test are measured by the test light pulse in the first higher-order mode using such a backscattered light measurement technique as illustrated in NPL 1 and NPL 2.

In the matrix calculation procedure S03, the coupling efficiency for each mode at the connection point of the optical fiber under test is calculated from the backscattered light intensity measured at least one of the first measurement procedure S01 and the second measurement procedure S02, and a matrix representing the mode coupling at the connection point is obtained. That is, in the matrix calculation procedure S03, the coupling efficiency for each mode at the connection point is calculated from the backscattered light intensity using such a method as illustrated in NPL 3 and NPL 4, and a matrix (mode coupling matrix) representing the mode coupling is obtained. The mode coupling matrix will be described later.

In the backscattered light intensity correction procedure S04, corrections for eliminating the effects of crosstalk at the connection point from the backscattered light intensities measured in the first measurement procedure S01 and the second measurement procedure S02 are performed by numerical processing using the mode coupling matrix obtained in the matrix calculation procedure S03. The details of the corrections will be described later.

In the loss calculation procedure S05, the loss after the connection point is calculated from the corrected backscattered light intensity obtained in the backscattered light intensity correction procedure S04.

Figure 2:
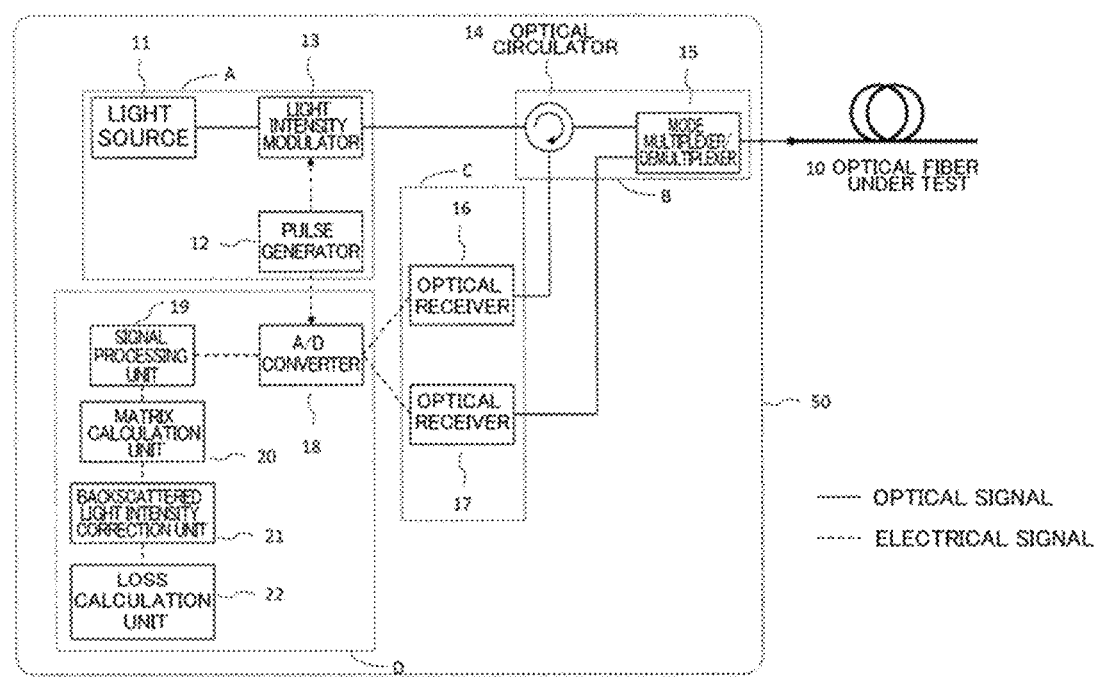
FIG. 2 is a diagram illustrating an optical pulse testing device according to the present invention.

FIG. 2 is a diagram illustrating a configuration example of an optical pulse testing device 101 of the present embodiment. The optical pulse testing device 101 includes a first measuring means, a second measuring means, a matrix calculation means, a backscattered light intensity correction means, and a loss calculation means. The first measuring means causes a test light pulse having a wavelength that can propagate in a fundamental mode and a first higher-order mode to be incident in the fundamental mode from one end of an optical fiber under test having a connection point and measures an intensity distribution of each of a fundamental mode component and a first higher-order mode component of a return light of the test light pulse with respect to the distance from the one end. The second measuring means causes a test light pulse having a wavelength that can propagate in the fundamental mode and the first higher-order mode to be incident in the first higher-order mode from one end of the optical fiber under test and measures an intensity distribution of each of a fundamental mode component and a first higher-order mode component of a return light of the test light pulse with respect to the distance from the one end. The matrix calculation means calculates the coupling efficiency between fundamental mode groups, the coupling efficiency between the fundamental mode and the first higher-order mode group, and the coupling efficiency between the first higher-order mode groups at the connection point of the optical fiber under test from one or both of the backscattered light intensity measured by the first measuring means and the backscattered light intensity measured by the second measuring means and obtains a mode coupling matrix at the connection point of the optical fiber under test, which has the coupling efficiencies as elements. The backscattered light intensity correction means corrects the backscattered light intensities measured by the first measuring means and the second measuring means using the mode coupling matrix obtained by the matrix calculation means. The loss calculation means calculates the loss on the other end side from the connection point of the optical fiber under test from the corrected backscattered light intensities obtained by the backscattered light intensity correction means.

The first measuring means and the second measuring means include a generation unit A, a mode multiplexing/demultiplexing unit B, a light receiving unit C, and a signal processing unit 19 in an arithmetic processing unit D. The generation unit A generates a test light pulse having a wavelength that can propagate through an optical fiber 10 under test in the fundamental mode and the first higher-order mode. The mode multiplexing/demultiplexing unit B causes the test light pulse generated by the generation unit A to be incident to the optical fiber 10 under test in either the fundamental mode or the first higher-order mode and separates the return light from the test light pulse into a fundamental mode component and a first higher-order mode component. The light receiving unit C photoelectrically converts the mode components of the return light separated by the mode multiplexing/demultiplexing unit B. The signal processing unit 19 obtains the intensity distribution of each of the mode components of the return light with respect to the distance from one end of the optical fiber 10 under test when the test light pulse is incident to one end of the optical fiber under test 10 in the fundamental mode on the basis of an output signal of the light receiving unit C converted to digital data.

The matrix calculation means has a matrix calculation unit 20 in the arithmetic processing unit D. The matrix calculation unit 20 calculates the inter-mode coupling efficiency at the connection point from the intensity distribution of each of the mode components of the return light and obtains a mode coupling matrix.

The backscattered light intensity correction means includes a backscattered light intensity correction unit 21 of the arithmetic processing unit D. The backscattered light intensity correction unit 21 performs corrections for eliminating the effects of crosstalk generated at the connection point from the backscattered light intensity distribution of each of the mode components of the return light obtained by the signal processing unit 19 by numerical processing using the mode coupling matrix obtained by the matrix calculation unit 20.

The loss calculation means has a loss calculation unit 22. The loss calculation unit 22 calculates the loss from the backscattered light intensity obtained by the backscattered light intensity correction unit 21.

The generation unit A includes a light source 11, a pulse generator 12, and a light intensity modulator 13. The light source 11 can output continuous light having a wavelength that can propagate through the optical fiber 10 under test in the fundamental mode and the first higher-order mode. The continuous light output from the light source 11 is pulsed by the light intensity modulator 13 according to the signal of the pulse generator 12 and a test light pulse is obtained. The light intensity modulator 13 is, for example, an acousto-optic modulator including an acoustic-optic switch for pulse-driving an acousto-optical element. The pulse generator 12 may output a trigger signal for determining the timing to start measurement of the backscattered light intensity distribution to the arithmetic processing unit D.

The mode multiplexing/demultiplexing unit B includes an optical circulator 14 and a mode multiplexer/demultiplexer 15. The test light pulse generated by the light intensity modulator 13 is incident to the mode multiplexer/demultiplexer 15 via the optical circulator 14. The mode multiplexer/demultiplexer 15 is a mode multiplexer/demultiplexer including, for example, a directional coupler configured by a planar lightwave circuit as described in NPL 1. The test light pulse is incident to one end of the optical fiber 10 under test from the mode multiplexer/demultiplexer 15 in either a fundamental mode or a first higher-order mode. At this time, an optical switch may be used to select one of the fundamental mode and the first higher-order mode.

When a test light pulse incident in the fundamental mode or the first higher-order mode propagates through the optical fiber 10 under test, a portion of the test light pulse is combined with the fundamental mode and the first higher-order mode propagating in the opposite direction due to Rayleigh scattering and backscattered light in the fundamental mode and the first higher-order mode are obtained. This backscattered light is incident again to the mode multiplexer/demultiplexer 15 as return light. At this time, the mode components of the fundamental mode and the first higher-order mode of the return light are separated by the mode multiplexer/demultiplexer 15.

The light receiving unit C has two optical receivers (16, 17). Among the return light components separated for each mode by the mode multiplexer/demultiplexer 15, the same mode component as the incident mode is incident to the optical receiver 16 via the optical circulator 14 and is photoelectrically converted. The mode component different from the incident mode is incident to the optical receiver 17 and is photoelectrically converted.

The arithmetic processing unit D includes an A/D (analog/digital) converter 18, the signal processing unit 19, the matrix calculation unit 20, the backscattered light intensity correction unit 21, and the loss calculation unit 22. The electrical signals from the optical receivers 16 and 17 are converted to digital data by the A/D converter 18. The digital data is input to the signal processing unit 19.

The signal processing unit 19 obtains the intensity distributions for the fundamental mode and first higher-order mode components of the return light. Further, the matrix calculation unit 20 calculates the inter-mode coupling efficiency at the connection point and obtains a matrix representing the mode coupling. Then, the backscattered light intensity correction unit 21 performs numerical processing for eliminating the effects of crosstalk generated at the connection point, and performs arithmetic processing for obtaining the corrected backscattered light intensity. The loss calculation unit 22 performs arithmetic processing for calculating the loss from the corrected backscattered light intensity.

Hereinafter, the arithmetic processing for performing numerical processing for eliminating the effects of crosstalk generated at the connection point and obtaining the corrected backscattered light intensity will be described.

Figure 3:
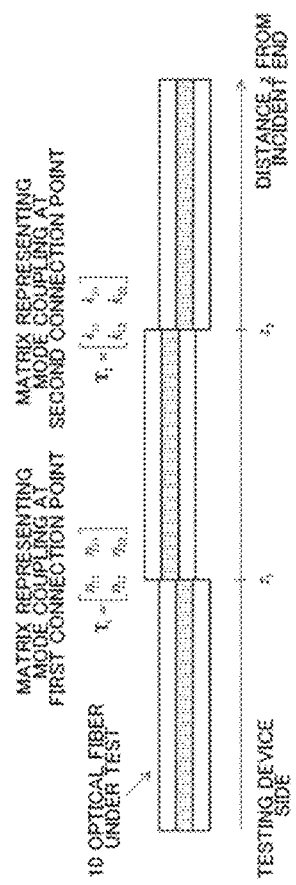
FIG. 3 is a diagram illustrating an optical fiber under test.

An optical fiber under test having two connection points as illustrated in FIG. 3 will be considered. A connection point at position $z_1$ on the near end side as viewed from a testing device side is referred to as a first connection point, and a connection point at position $z_2$ on the far end side is referred to as a second connection point. The inter-mode coupling matrices representing the mode coupling at the respective connection points are $T_1$ and $T_2$, respectively, and are defined by the following formulas.

[Formula F1]

(F1)

$$T_1 = \begin{bmatrix} \eta_{11} & \eta_{21} \\ \eta_{12} & \eta_{22} \end{bmatrix} \quad (51)$$

$$T_2 = \begin{bmatrix} k_{11} & k_{21} \\ k_{12} & k_{22} \end{bmatrix} \quad (52)$$

Here, $\eta_{ij}$ and $k_{ij}$ represent the coupling efficiencies between modes i and mode j at the first connection point and the second connection point, respectively. The subscripts i and j (i, j=1, 2) mean the propagation mode, "1" represents the fundamental mode (LP01 mode), and "2" represents the first higher-order mode (LP11 mode). Specifically, $\eta_{11}$ is the coupling efficiency between the fundamental mode groups, $\eta_{12}$ and $\eta_{21}$ are the coupling efficiency between the fundamental mode and the first higher-order mode group, and $\eta_{22}$ is the coupling efficiency between the first higher-order mode groups. The same applies to $k_{ij}$. Further, a matrix representing the transmission loss in the optical fiber under test is L(z), a matrix of the capture rate between modes in the backscattering process is B(z), and the matrices are defined by the following formulas.

[Formula F2]

$$L(z) = \begin{bmatrix} \exp(-\alpha z) & 0 \\ 0 & \exp(-\alpha z) \end{bmatrix} = \exp(-\alpha z)\begin{bmatrix} 1 & 0 \\ 0 & 1 \end{bmatrix} = \exp(-\alpha z)I \quad (53)$$

$$B(z) = \begin{bmatrix} b_{11}(z) & b_{21}(z) \\ b_{12}(z) & b_{22}(z) \end{bmatrix} \quad (54)$$

(F2)

Here, α represents a loss factor in an optical fiber. I is a 2×2 unit matrix. Further, $b_{ij}(z)$ represents the capture rate when the test light of mode i is Rayleigh-scattered at the position z and is combined with the mode j propagating in the opposite direction.

A case where the test light pulse is incident in the fundamental mode in the first measurement procedure S01 will be considered. The matrix of incident test light pulse is $P_{in(S01)}$ and is defined as follows.

[Formula F3]

$$P_{in(S01)} = \begin{bmatrix} 1 \\ 0 \end{bmatrix} \quad (55)$$

(F3)

At this time, when the intensities of the fundamental mode component and the first higher-order mode component in the backscattered light are the matrices $P_{bs1}(z)$ and $P_{bs2}(z)$, respectively, they can be represented by the following formulas.

[Formula F4]

(F4)

$$\begin{bmatrix} P_{bs1}(z) \\ P_{bs2}(z) \end{bmatrix} = \begin{cases} L(z) \times B(z) \times L(z) \times P_{in(S01)} & (0 \le z < z_1) \\ L(z_1) \times T_1 \times L(z-z_1) \times \\ \quad B(z) \times L(z-z_2) \times T_1 \times & (z_1 \le z < z_2) \\ \quad L(z_1) \times P_{in(S01)} \\ L(z_1) \times T_1 \times L(z_2-z_1) \times T_2 \times \\ L(z-z_2) \times B(z) \times L(z-z_2) \times T_2 \times & (z_2 \le z) \\ L(z_2-z_1) \times T_1 \times L(z_1) \times P_{in(S01)} \end{cases} \quad (56)$$

$$= \begin{cases} \exp(-2\alpha z)I \times B(z) \times P_{in(S01)} & (0 \le z < z_1) \\ \exp(-2\alpha z)I \times T_1 \times B(z) \times \\ \quad T_1 \times P_{in(S01)} & (z_1 \le z < z_2) \\ \exp(-2\alpha z)I \times T_1 \times T_2 \times B(z) \times \\ \quad T_2 \times T_1 \times P_{in(S01)} & (z_2 \le z) \end{cases}$$

Next, a case where the test light pulse is incident in the first higher-order mode in the second measurement procedure S02 will be considered. The matrix of incident test light pulse is $P_{in(S02)}$ and is defined as follows.

[Formula F5]

(F5)

$$P_{in(S02)} = \begin{bmatrix} 0 \\ 1 \end{bmatrix} \quad (57)$$

At this time, when the intensities of the fundamental mode component and the first higher-order mode component in the backscattered light are the matrices $P_{bs3}(z)$ and $P_{bs4}(z)$, respectively, they can be represented by the following formulas.

[Formula F6]

(F6)

$$\begin{bmatrix} P_{bs3}(z) \\ P_{bs4}(z) \end{bmatrix} = \begin{cases} L(z) \times B(z) \times L(z) \times P_{in(S02)} & (0 \le z < z_1) \\ L(z_1) \times T_1 \times L(z-z_1) \times B(z) \times \\ \quad L(z-z_1) \times T_1 \times L(z_1) \times P_{in(S02)} & (z_1 \le z < z_2) \\ L(z_1) \times T_1 \times L(z_2-z_1) \times T_2 \times \\ L(z-z_2) \times B(z) \times L(z-z_2) \times T_2 \times & (z_2 \le z) \\ L(z_2-z_1) \times T_1 \times L(z_1) \times P_{in(S02)} \end{cases} \quad (58)$$

$$= \begin{cases} \exp(-2\alpha z)I \times B(z) \times P_{in(S02)} & (0 \le z < z_1) \\ \exp(-2\alpha z)I \times T_1 \times B(z) \times T_1 \times P_{in(S02)} & (z_i \le z < z_2) \\ \exp(-2\alpha z)I \times T_1 \times T_2 \times B(z) \times \\ \quad T_2 \times T_1 \times P_{in(S02)} & (z_2 \le z) \end{cases}$$

Formulas (55) to (58) can be summarized as follows.

[Formula F7]

(F7)

$$P_{bs}(z) = \begin{bmatrix} P_{bs1}(z) & P_{bs3}(z) \\ P_{bs2}(z) & J_{bs4}(z) \end{bmatrix} \quad (59)$$

$$= \begin{cases} \exp(-2\alpha z)I \times B(z) \times P_{in} & (0 \le z < z_1) \\ \exp(-2\alpha z)I \times T_1 \times B(z) \times T_1 \times P_{in} & (z_1 \le z < z_2) \\ \exp(-2\alpha z)I \times T_1 \times T_2 \times B(z) \times T_2 \times T_1 \times P_{in} & (z_2 \le z) \end{cases}$$

Here, the matrix $P_{in}$ is represented by the following formula.

[Formula F8]

(F8)

$$P_{in} = [P_{in(S01)} \; P_{in(S02)}] = \begin{bmatrix} 1 & 0 \\ 0 & 1 \end{bmatrix} \quad (60)$$

In the above, the matrices $P_{in(S01)}$ and $P_{in(S02)}$ of the incident test light pulses are set as Formulas (55) and (57), but they may be set as different values. However, it is necessary to set the values so that $P_{in}$ has an inverse matrix.

From Formula (59), it can be seen that the backscattered light intensity when $z_2 \ge z_1$ is affected by the value of the matrix $T_1$ of Formula (51) representing the mode coupling at the first connection point.

Therefore, when for both sides of Formula (59), the matrix $P_{in}^{-1}$ is multiplied from the right side of the formula in the range of $z<z_1$, and the matrix $T_1^{-1}$ is multiplied from the left side of the formula and the matrix $P_{in}^{-1} \times T_1^{-1}$ is multiplied from the right side in the range of $z_2 \ge z_1$, a matrix $P_{corrected}(z)$ of the corrected waveform in which the effects of crosstalk generated at the first connection point are eliminated can be obtained. The corrected waveform matrix $P_{corrected}(z)$ can be represented by the following formula.

[Formula F9]

$$P_{corrected}(z) = \begin{cases} P_{bs}(z) \times P_{in}^{-1} = & \exp(-2\alpha z)I \times B(z) & (0 \le z < z_1) \\ T_1^{-1} \times P_{bs}(z) \times P_{in}^{-1} \times T_1^{-1} = & \exp(-2\alpha z)I \times B(z) & (z_1 \le z < z_2) \\ T_1^{-1} \times P_{bs}(z) \times P_{in}^{-1} \times T_1^{-1} = & \exp(-2\alpha z)I \times T_2 \times B(z) \times T_2 & (z_2 \le z) \end{cases} \quad (61)$$
(F9)

Here, the matrix $T_1^{-1}$ can be obtained by the method described later.

Therefore, the loss at the second connection point can be obtained from the value around $z=z_2$ in the corrected waveform of Formula (61).

In the above, the matrix operation for obtaining the corrected waveform is divided into a range of $z<z_1$ and a range of $z_2 \ge z_1$, but from the viewpoint of accurately obtaining the loss at the second connection point, a process of multiplying the matrix $T_1^{-1}$ from the left side and the matrix $P_{in}^{-1} \times T_1^{-1}$ from the right side for all regions of z may be used. At this time, the corrected waveform matrix $P_{corrected}(z)$ can be represented by the following formula.

[Formula F10]

$$P_{corrected}(z) = T_1^{-1} \times P_{bs}(z) \times P_{in}^{-1} \times T_1^{-1} \quad (62)$$
$$= \begin{cases} \exp(-2\alpha z)I \times T_1^{-1} \times B(z) \times P_{in}^{-1} \times T_1^{-1} & (0 \le z < z_1) \\ \exp(-2\alpha z)I \times B(z) & (z_1 \le z < z_2) \\ \exp(-2\alpha z)I \times T_2 \times B(z) \times T_2 & (z_2 \le z) \end{cases}$$
(F10)

That is, before and after a measurement target point, a matrix operation for eliminating the effects of a connection point before the point may be performed.

[Mode Coupling Matrix Acquisition Method]

A method of obtaining the mode coupling matrices illustrated in Formulas (51) and (52) will be described.

The electric field distributions of the fundamental mode and the two orthogonal first higher-order modes in the optical fiber are approximated by the following Gaussian function and Hermite-Gaussian function.

[Formula M1]

(M1)

$$E_1(x, y) = \sqrt{\frac{2}{\pi w^2}} \exp\left(-\frac{x^2 + y^2}{w^2}\right) \quad (1)$$

$$E_2(x, y) = \sqrt{\frac{2}{\pi}} \frac{2}{w^2} x \exp\left(-\frac{x^2 + y^2}{w^2}\right) \quad (2)$$

$$E_3(x, y) = \sqrt{\frac{2}{\pi}} \frac{2}{w^2} y \exp\left(-\frac{x^2 + y^2}{w^2}\right) \quad (3)$$

Figure 10:
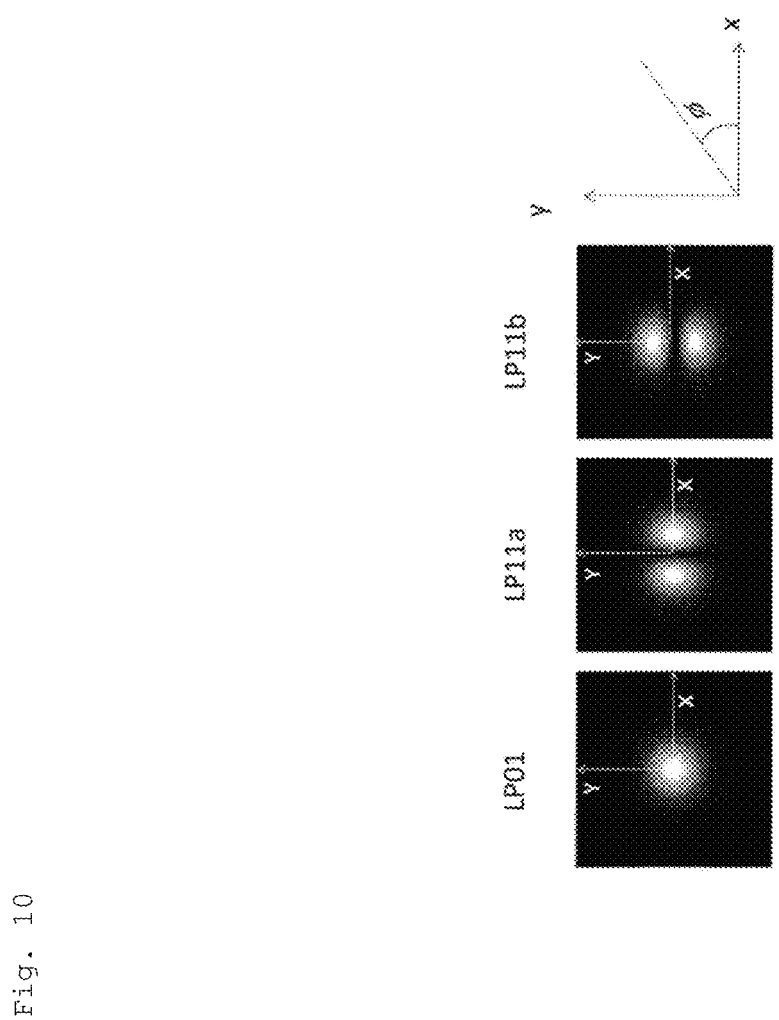
FIG. 10 is a diagram illustrating the relationship between the light intensity distributions in the fundamental mode and the first higher-order mode and the xy coordinates.

$E_1$ is the electric field distribution in the fundamental mode (LP01 mode), $E_2$ and $E_3$ are the electric field distributions in the two orthogonal first higher-order modes (LP11a and LP11b modes), w is the mode field diameters of the fundamental mode and the first higher-order mode, and x and y are coordinates with the center in the cross section of the optical fiber as the origin. FIG. 10 is a diagram illustrating the relationship between the light intensity distributions of each mode and the xy coordinates.

The inter-mode coupling efficiency $\eta_{mn}$ of the optical fiber under test in which two optical fibers of the same type are connected is represented by the following formula.

[Formula M2]

(M2)

$$\eta_{mn} = \frac{\left|\int\int E_m(x, y) E_n(x - d\cos\theta, y - d\sin\theta) dxdy\right|^2}{\int\int |E_m(x, y)|^2 dxdy \int\int |E_n(x, y)|^2 dxdy} \quad (4)$$

$E_m$ and $E_n$ represent the electric field distribution of the mode input to the connection portion and the electric field distribution of the mode output from the connection portion, respectively. That is, $\eta_{mn}$ represents the efficiency of coupling from mode m to mode n at the connection portion. Further, d represents the axial misalignment amount at the connection point, and $\theta$ represents the angle between the x-axis and the axial misalignment direction. From Formulas (1) to (4), the following formulas are obtained.

[Formula M3]

(M3)

$$\eta_{11} = \exp\left(-\frac{d^2}{w^2}\right) \quad (5)$$

$$\eta_{12} = \eta_{21} = \frac{d^2}{w^2}\cos^2\theta \cdot \exp\left(-\frac{d^2}{w^2}\right) \quad (6)$$

$$\eta_{13} = \eta_{13} = \frac{d^2}{w^2}\sin^2\theta \cdot \exp\left(-\frac{d^2}{w^2}\right) \quad (7)$$

$$\eta_{22} = \left(1 - \frac{d^2}{w^2}\cos^2\theta\right)^2 \exp\left(-\frac{d^2}{w^2}\right) \quad (8)$$

$$\eta_{23} = \eta_{32} = \left(\frac{d^2}{w^2}\sin\theta\cos\theta\right)^2 \exp\left(-\frac{d^2}{w^2}\right) \quad (9)$$

$$\eta_{33} = \left(1 - \frac{d^2}{w^2}\sin^2\theta\right)^2 \exp\left(-\frac{d^2}{w^2}\right) \quad (10)$$

Here, since the two orthogonal first higher-order modes are strongly coupled during propagation, it is difficult to distinguish them in actual measurements. Therefore, the two orthogonal first higher-order modes are collectively considered as one first higher-order mode group. At this time, Formulas (5) to (10) can be represented as the following formulas.

[Formula M4]

$$\eta_{01-01} = \exp\left(-\frac{d^2}{w^2}\right) \tag{11}$$

$$\eta_{01-11} = \eta_{11-01} = \frac{d^2}{w^2}\exp\left(-\frac{d^2}{w^2}\right) \tag{12}$$

$$\eta_{11-11} = \left(1 - \frac{d^2}{w^2} + \frac{1}{2}\frac{d^4}{w^4}\right)\exp\left(-\frac{d^2}{w^2}\right) \tag{13}$$

$\eta_{01-01}$ is the coupling efficiencies $\eta_{11}$ and $k_{11}$ between the fundamental modes described in Formulas F1 to F10. $\eta_{01-11}$ and $\eta_{11-01}$ are the coupling efficiencies $\eta_{12}$ and $k_{12}$ and $\eta_{21}$ and $k_{21}$ between the fundamental mode and the first higher-order mode group described in Formulas F1 to F10. $\eta_{11-11}$ is the coupling efficiency $\eta_{22}$ and $k_{22}$ between the first higher-order mode groups described in Formulas F1 to F10. As a result, the angle θ representing the axial misalignment direction can be eliminated.

On the other hand, the transmittances at the connection points in the backscattered light intensities of the fundamental mode component and the first higher-order mode component when the test light pulse is incident to the optical fiber under test in the fundamental mode can be obtained by the following formulas.

[Formula M5]

$$L_1 = (\eta_{01-01} + \eta_{11-01})(\eta_{01-01} + \eta_{11-01}) \tag{14}$$

$$L_2 = (\eta_{01-01} + \eta_{01-11})(\eta_{01-11} + \eta_{11-11}) \tag{15) (M5}$$

$L_1$ and $L_2$ are the transmittances at the connection points in the backscattered light intensities of the fundamental mode component and the first higher-order mode component, respectively.

The following formula is obtained from Formulas (11) to (15).

[Formula M6]

$$\left(\frac{d^2}{w^2}\right)^2 - \frac{2L_2}{L_1}\left(\frac{d^2}{w^2}\right) + 2\left(1 - \frac{L_2}{L_1}\right) = 0 \tag{16}$$

Formula (16) has multiple solutions when $(d^2/w^2)$ is $\sqrt{3}-1$, and there are two solutions under other conditions. Considering that the axial misalignment amount that can occur at the connection point is usually 2 μm or less and the mode field diameter of the optical fiber at the test wavelength is 4.68 μm or more, the solution of Formula (16) is as follows.

[Formula M7]

$$\frac{d^2}{w^2} = \frac{L_2}{L_1} - \sqrt{\left(\frac{L_2}{L_1}\right)^2 + \frac{2L_2}{L_1} - 2} \tag{17}$$

Therefore, by calculating $(d^2/w^2)$ from the measured transmittances $L_1$ and $L_2$ using Formula (17) and substituting it into Formulas (11) to (13), the inter-mode coupling efficiency ($\eta_{11}$, $\eta_{21}$, $\eta_{12}$, $\eta_{22}$, $k_{11}$, $k_{21}$, $k_{12}$, $k_{22}$) can be calculated, and the mode coupling matrix illustrated in Formulas (51) and (52) can be obtained. That is, in the matrix calculation procedure S03 of FIG. 1, the transmittances $L_1$ and $L_2$ at the first connection point ($z=z_1$) and the transmittances $L_1$ and $L_2$ at the second connection point ($z=z_2$) are measured from the backscattered light intensity obtained in the first measurement procedure S01 or the second measurement procedure S02, and the mode coupling matrices $T_1$ and $T_2$ are obtained. The matrix $T_1^{-1}$ is an inverse matrix of the mode coupling matrix $T_1$.

The mode-dependent loss and the inter-mode crosstalk can also be calculated by logarithmically transforming the inter-mode coupling efficiency calculated by the above method.

Example

For reference, the results of numerical calculations for the above contents are illustrated below. As the optical fiber under test, an optical fiber having a total length of 1500 m having an axially misaligned connection point 1 and an axially misaligned connection point 2 at 500 m and 1000 m points will be considered. The inter-mode coupling efficiency at the axially misaligned connection point 1 is defined as follows.

[Formula F11]

$$\eta_{11} = \exp\left(-\frac{d_1^2}{w^2}\right) \tag{63}$$

$$\eta_{12} = \eta_{21} = \frac{d_1^2}{w^2}\exp\left(-\frac{d_1^2}{w^2}\right) \tag{64}$$

$$\eta_{22} = \left(1 - \frac{d_1^2}{w^2} + \frac{1}{2}\frac{d_1^4}{w^4}\right)\exp\left(-\frac{d_1^2}{w^2}\right) \tag{65}$$

Here, $d_1$ is the axial misalignment amount at the connection point 1, and w is the mode field radius of the optical fiber under test. Similarly, the inter-mode coupling efficiency at the axially misaligned connection point 2 is defined as follows.

[Formula F12]

$$k_{11} = \exp\left(-\frac{d_2^2}{w^2}\right) \tag{66}$$

$$k_{12} = k_{21} = \frac{d_2^2}{w^2}\exp\left(-\frac{d_2^2}{w^2}\right) \tag{67}$$

-continued $$k_{22} = \left(1 - \frac{d_2^2}{w^2} + \frac{1}{2}\frac{d_2^4}{w^4}\right)\exp\left(-\frac{d_2^2}{w^2}\right) \quad (68)$$

$d_2$ is the axial misalignment amount at the connection point 2.

Further, in this numerical calculation, various parameters are set as $\alpha=0.1842\times10^{-3}$ ($\approx 0.8$ dB/km), $b_{ij}=0.0011$, and $w=4.1\times10^{-6}$.

Figure 4:
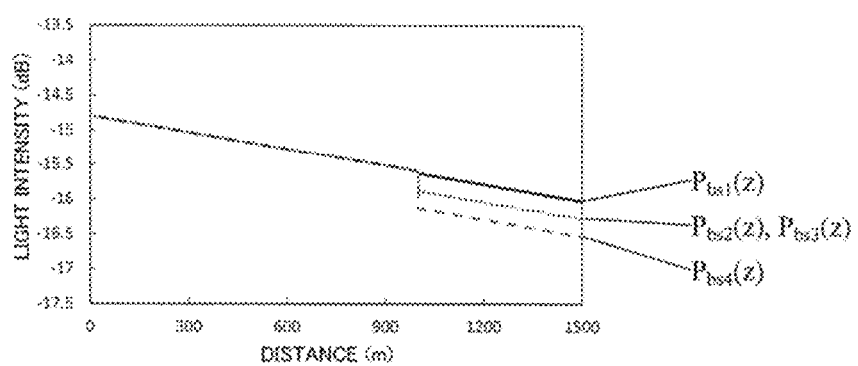
FIG. 4 is a diagram illustrating an example of a backscattered waveform.

FIG. 4 illustrates an example of the calculation result of the backscattered light waveform when $d_1=0$ and $d_2=1.5\times10^{-6}$, in which the horizontal axis indicates the distance and the vertical axis indicates the light intensity. The solid line indicates $P_{bs1}(z)$ in Formula (56), the dotted line indicates $P_{bs2}(z)$ and $P_{bs3}(z)$ in Formulas (56) and (58), and the broken line indicates $P_{bs4}(z)$ in Formula (58), which are displayed in logarithmic representations. Here, the losses at the second connection point (1000 m point) of the solid line, the dotted line, and the broken line are approximately 0.04 dB, 0.29 dB, and 0.54 dB, respectively.

Figure 5:
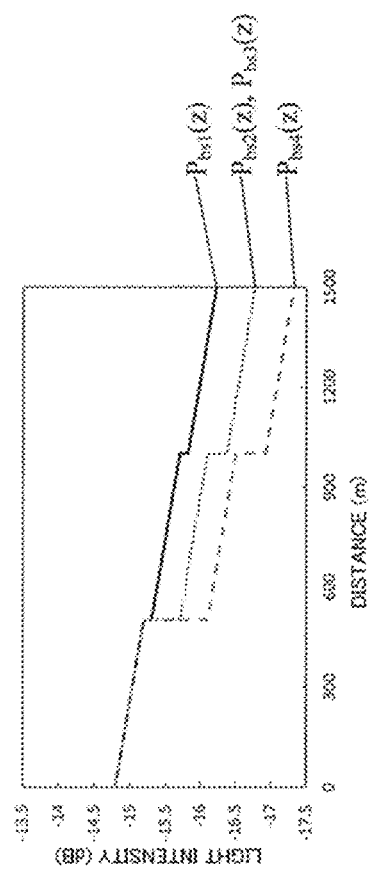
FIG. 5 is a diagram illustrating an example of a backscattered waveform.

FIG. 5 illustrates an example of the calculation result of the backscattered light waveform when $d_1=2.0\times10^{-6}$ and $d_2=1.5\times10^{-6}$, in which the horizontal axis indicates the distance and the vertical axis indicates the light intensity, respectively. The solid line, the dotted line and the broken line have the same meanings as in FIG. 4. The losses at the second connection point (approximately 1000 m point) of the solid line, the dotted line and the broken line are approximately 0.13 dB, 0.27 dB and 0.42 dB, respectively, which are different from the results in FIG. 4 even though the axial misalignment amount of the second connection point is the same.

Figure 6:
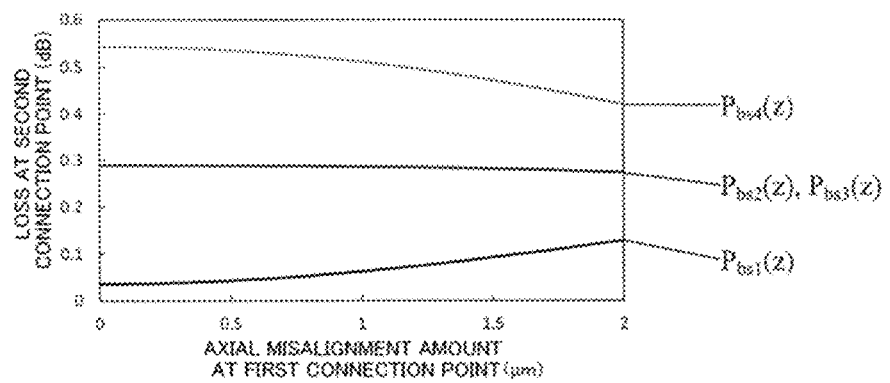
FIG. 6 is a diagram for explaining the relationship between an axial misalignment amount of a first connection point and the loss obtained from a second connection point.

FIG. 6 illustrates the loss value at the second connection point when $d_2=1.5\times10^{-6}$, in which the horizontal axis indicates the axial misalignment amount of the first connection point. It can be seen that, when the axial misalignment amount increases, the backscattered light intensity $P_{bs1}(z)$ increases, the backscattered light intensities $P_{bs2}(z)$ and $P_{bs3}(z)$ decreases slightly and the backscattered light intensity $P_{bs4}(z)$ decreases.

Figure 7:
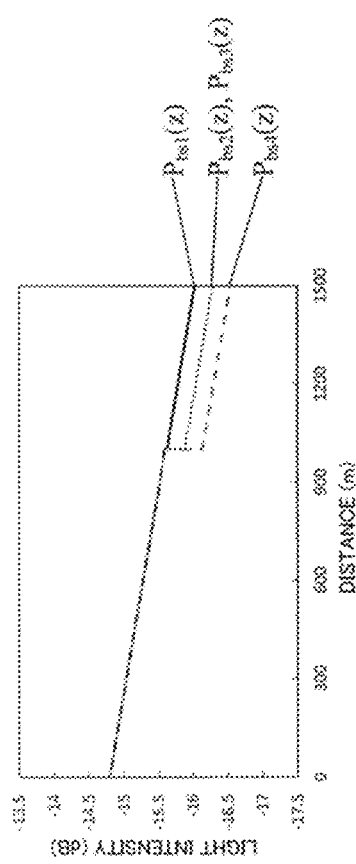
FIG. 7 is a diagram illustrating an example of a corrected backscattered waveform.
Figure 8:
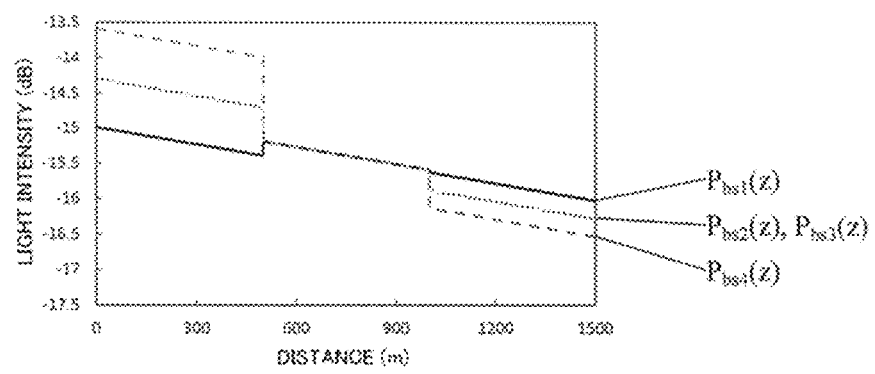
FIG. 8 is a diagram illustrating an example of a corrected backscattered waveform.

FIGS. 7 and 8 are waveforms when the waveform of FIG. 5 is subjected to the processing of Formulas (11) and (12). In the waveform of FIG. 7, the inter-mode coupling at the first connection point (500 m point) is corrected, a waveform similar to that of FIG. 4 is obtained, and the losses at the second connection point (1000 m point) of the backscattered light intensities ($P_{bs1}(z)$ to $P_{bs4}(z)$) are approximately 0.04 dB, 0.29 dB, and 0.54 dB, respectively. The loss at the first connection point in FIG. 8 is not the same as the waveform in FIG. 4, but the losses at the second connection point (1000 m point) of the backscattered light intensities ($P_{bs1}(z)$ to $P_{bs4}(z)$) are approximately 0.04 dB, 0.29 dB, and 0.54 dB, respectively, which are the same as the results illustrated in FIG. 4.

Figure 9:
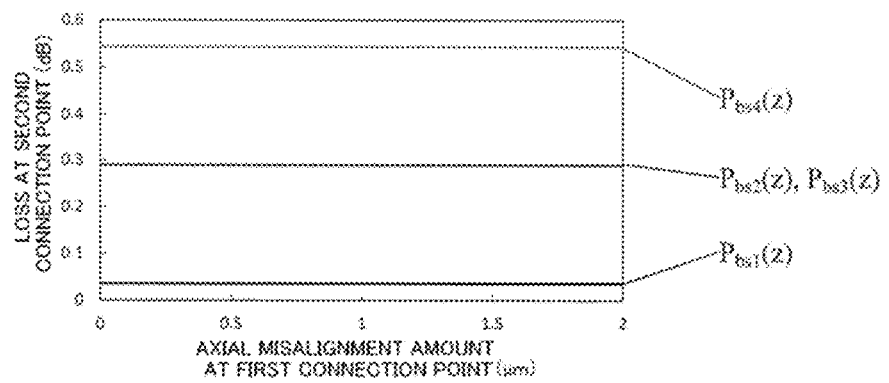
FIG. 9 is a diagram illustrating the corrected loss at the second connection point.

FIG. 9 illustrates the calculation results of the loss value at the second connection point calculated from the corrected waveform obtained when the processing of Formulas (11) and (12) is performed, in which the horizontal axis indicates the axial misalignment amount of the first connection point. It can be seen that the correct loss value can be obtained regardless of the value of the axial misalignment amount at the first connection point.

Embodiment 2

Figure 11:
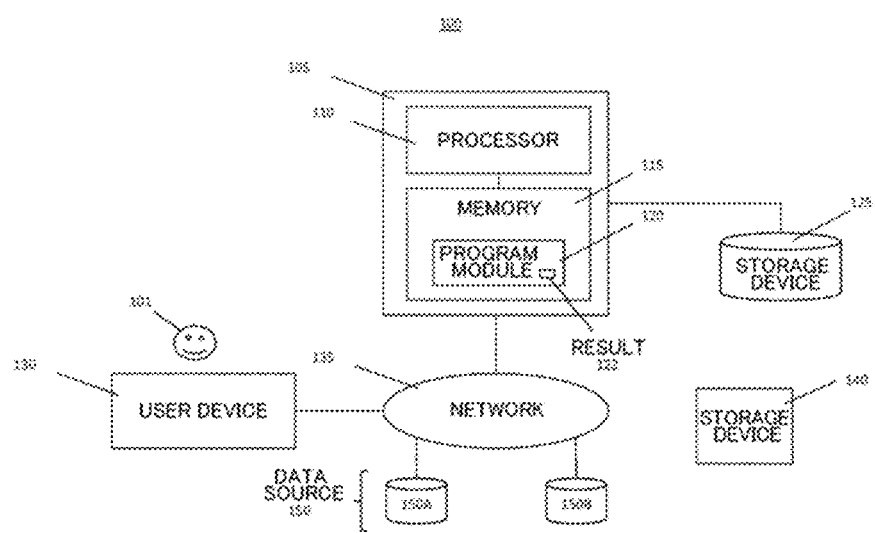
FIG. 11 is a diagram illustrating an arithmetic processing unit of the optical pulse testing device according to the present invention.

The arithmetic processing unit D can also be realized by a computer and a program, and the program can be recorded on a recording medium or provided through a network. FIG. 11 illustrates a block diagram of a system 100. The system 100 includes a computer 105 connected to a network 135.

The network 135 is a data communication network. The network 135 may be a private network or a public network, and may include any or all of (a) a personal area network covering a room, for example, (b) a local area network covering a building, for example, (c) a campus area network covering a campus, for example, (d) a metropolitan area network covering a city, for example, (e) a wide area network covering an area connecting across urban, local, or national boundaries, for example, and (f) the Internet. Communication is carried out by electronic signals and optical signals via the network 135.

The computer 105 includes a processor 110 and a memory 115 connected to the processor 110. Although the computer 105 is represented as a stand-alone device in the present specification, it is not so limited, but rather may be connected to other devices (not illustrated) in the distributed processing system.

The processor 110 is an electronic device composed of logic circuits that respond to and execute commands.

The memory 115 is a tangible computer-readable storage medium in which a computer program is encoded. In this regard, the memory 115 stores data and commands (that is, program codes) readable and executable by the processor 110 to control the operation of the processor 110. The memory 115 can be realized by a random access memory (RAM), a hard drive, a read-only memory (ROM), or a combination thereof. One of the components of the memory 115 is a program module 120.

The program module 120 includes commands for controlling the processor 110 so as to perform the processes described herein. Although the operations are described in the present specification as being performed by the computer 105 or a method or process or a subordinate process thereof, those operations are actually performed by the processor 110.

The term "module" is used herein to refer to a functional operation that can be embodied as either a stand-alone component or an integrated configuration consisting of multiple subordinate components. Therefore, the program module 120 can be realized as a single module or as a plurality of modules that operate in cooperation with each other. Further, the program module 120 is described herein as being installed in memory 115 and thus implemented in software, but the program module 120 may be realized by hardware (for example, electronic circuits), firmware, software, or a combination thereof.

Although the program module 120 is illustrated as having already been loaded into the memory 115, it may be configured to be located on a storage device 140 for later loading into the memory 115. The storage device 140 is a tangible computer-readable storage medium that stores the program module 120. Examples of the storage device 140 include a compact disk, a magnetic tape, a read-only memory, an optical storage medium, a memory unit composed of a hard drive or a plurality of parallel hard drives, and a universal serial bus (USB) flash drive. Alternatively, the storage device 140 may be a random access memory or other types of electronic storage device located in a remote storage system (not illustrated) and connected to the computer 105 via the network 135.

The system 100 further includes a data source 150A and a data source 150B that are collectively referred to herein as the data source 150 and are communicably connected to the network 135. In practice, the data source 150 can include any number of data sources, that is, one or more data sources. The data source 150 includes unstructured data and can include social media.

The system 100 further includes a user device 130 operated by a user 101 and connected to the computer 105 via the network 135. Examples of the user device 130 include input devices such as keyboards or voice recognition subsystems that allow the user 101 to convey information and command selections to the processor 110. The user device 130 further includes an output device such as a display device, a printer or a speech synthesizer. A cursor control unit such as a mouse, a trackball, or a touch-sensitive screen allows the user 101 to operate the cursor on the display device to convey further information and command selections to the processor 110.

The processor 110 outputs the execution result 122 of the program module 120 to the user device 130. Alternatively, the processor 110 can deliver the output to a storage device 125, such as a database or memory, for example, or to a remote device (not illustrated) via the network 135.

For example, the program that performs the flowchart of FIG. 1 may be the program module 120. The system 100 can be operated as the arithmetic processing unit D.

The term "comprising" or "including" when used in this specification is taken to specify the presence of stated features, integers, steps, or components but does not preclude the presence or addition of one or more other features, integers, steps, components or groups thereof. The terms "a" and "an" are indefinite articles and thus do not preclude embodiments in which elements with the introductory phrase "a" or "an" are present plurally.

Other Embodiments

The present invention is not limited to the above embodiments, and can be modified and implemented in various ways without departing from the gist of the present invention. In short, the present invention is not limited to a higher-level embodiment as it is, and at the implementation stage, the components can be modified and embodied within a range that does not deviate from the gist thereof. For example, in the above embodiment, the optical fiber in which three optical fibers are connected in series has been described as the optical fiber under test, but the optical fiber in which four or more optical fibers are connected in series may be used as the optical fiber under test.

A plurality of components disclosed in the above-described embodiments can be appropriately combined to form various inventions. For example, some of all the components illustrated in the embodiments may be eliminated. Moreover, components from different embodiments may be combined appropriately.

REFERENCE SIGNS LIST

10 Optical fiber under test
11 Light source
12 Pulse generator
13 Light intensity modulator
14 Optical circulator
15 Mode multiplexer/demultiplexer
16, 17 Optical receiver
18 A/D converter
19 Signal processing unit
20 Matrix calculation unit
21 Backscattered light intensity correction unit
22 Loss calculation unit
50 Optical pulse testing device
100 System
101 User
105 Computer
110 Processor
115 Memory
120 Program module
122 Result
125 Storage device
130 User device
135 Network
140 Storage device
150 Data source

The invention claimed is:

1. An optical pulse testing method comprising:
inputting a test light pulse in a fundamental mode to one end of an optical fiber under test having a connection point, the test light pulse having a wavelength that can propagate in the fundamental mode and a first higher-order mode;
measuring one intensity distribution of each of a fundamental mode component and a first higher-order mode component of a return light of the test light pulse with respect to a distance from the one end;
inputting another test light pulse in the first higher-order mode to the one end of the optical fiber under test, the another test light pulse having a wavelength that can propagate in the fundamental mode and the first higher-order mode;
measuring other intensity distribution of each of a fundamental mode component and a first higher-order mode component of a return light of the test light pulse with respect to the distance from the one end;
calculating a coupling efficiency between fundamental mode groups, a coupling efficiency between the fundamental mode and a first higher-order mode group, and a coupling efficiency between the first higher-order mode groups at the connection point of the optical fiber under test, which are calculated from one or both of one backscattered light intensity of the one intensity distribution and another backscattered light intensity of the other intensity distribution;
obtaining a mode coupling matrix at the connection point of the optical fiber under test, which has the coupling efficiencies as elements;
correcting the one backscattered light intensity and the another backscattered light intensity using the mode coupling matrix; and
calculating loss on an opposing end side from the connection point of the optical fiber under test, the loss is calculated from the corrected backscattered light intensities.

2. The optical pulse testing method according to claim 1, wherein the backscattered light intensities are corrected using Formula (C1),

[Formula C1]

$$P_{corrected}(z) = \begin{cases} P_{bs}(z) \times P_{in}^{-1} & (0 \leq z < z_1) \\ T_1^{-1} \times P_{bs}(z) \times P_{in}^{-1} \times T_1^{-1} & (z_1 \leq z < z_2) \\ T_1^{-1} \times P_{bs}(z) \times P_{in}^{-1} \times T_1^{-1} & (z_2 \leq z) \end{cases} \quad (C1)$$

where z is the distance from the one end of the optical fiber under test, $z_1$ is the distance from the one end to a first connection point present in the optical fiber under test, $z_2$ is the distance ($z_1 < z_2$) from the one end to a second connection point present in the optical fiber under test, $P_{corrected}(Z)$ is a matrix of the corrected backscattered light intensities, $P_{bs}(z)$ is a matrix whose elements are the one back scattered light intensity and the another back scattered light intensity, $P_{in}$ is a matrix of the test light pulse, and $T_1$ is a mode coupling matrix at the first connection point.

3. An optical pulse testing device comprising:

a measurement circuit that inputs a test light pulse in a fundamental mode to one end of an optical fiber under test having a connection point, the test light pulse having a wavelength that can propagate in the fundamental mode and a first higher-order mode and measures one intensity distribution of each of a fundamental mode component and a first higher-order mode component of a return light of the test light pulse with respect to the distance from the one end of the optical fiber under test;

another measurement circuit that inputs another test light pulse in the first higher-order mode to the one end of the optical fiber under test, the another test light pulse having a wavelength that can propagate in the fundamental mode and the first higher-order mode and measures other intensity distribution of each of a fundamental mode component and a first higher-order mode component of a return light of the test light pulse with respect to the distance from the one end;

a matrix calculation circuit that calculates a coupling efficiency between fundamental mode groups, a coupling efficiency between the fundamental mode and a first higher-order mode group, and a coupling efficiency between the first higher-order mode groups at the connection point of the optical fiber under test, which are calculated from one or both of one backscattered light intensity of the one intensity distribution and another backscattered light intensity of the other intensity distribution and obtains a mode coupling matrix at the connection point of the optical fiber under test, which has the coupling efficiencies as elements;

a backscattered light intensity correction circuit that corrects the one backscattered light intensity and the another backscattered light intensity using the mode coupling matrix; and a loss calculation circuit that calculates loss on an opposing end side from the connection point of the optical fiber under test, the loss is calculated from the corrected backscattered light intensities.

4. The optical pulse testing device according to claim 3, wherein the backscattered light intensity correction circuit corrects the backscattered light intensity using Formula (C1),

[Formula C1]

$$P_{corrected}(z) = \begin{cases} P_{bs}(z) \times P_{in}^{-1} & (0 \leq z < z_1) \\ T_1^{-1} \times P_{bs}(z) \times P_{in}^{-1} \times T_1^{-1} & (z_1 \leq z < z_2) \\ T_1^{-1} \times P_{bs}(z) \times P_{in}^{-1} \times T_1^{-1} & (z_2 \leq z) \end{cases} \quad (C1)$$

where z is the distance from the one end of the optical fiber under test, $z_1$ is the distance from the one end to a first connection point present in the optical fiber under test, $z_2$ is the distance ($z_1 < z_2$) from the one end to a second connection point present in the optical fiber under test, $P_{corrected}(Z)$ is a matrix of the corrected backscattered light intensities, $P_{bs}(z)$ is a matrix whose elements are the one back scattered light intensity and the another back scattered light intensity, $P_{in}$ is a matrix of the test light pulse, and $T_1$ is a mode coupling matrix at the first connection point.

* * * * *